April 12, 1966   H. JORDAN ETAL   3,246,132
SUPPORTING STRUCTURE FOR WASTE DISPOSAL APPARATUS
Filed Nov. 18, 1963   2 Sheets-Sheet 1
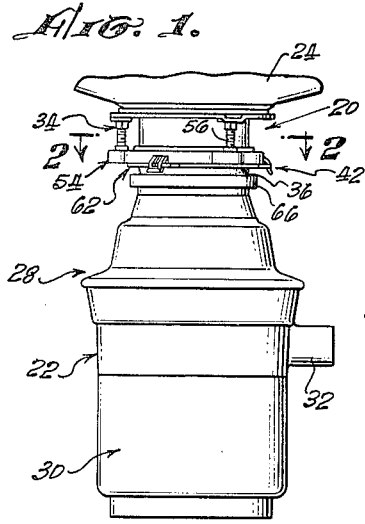
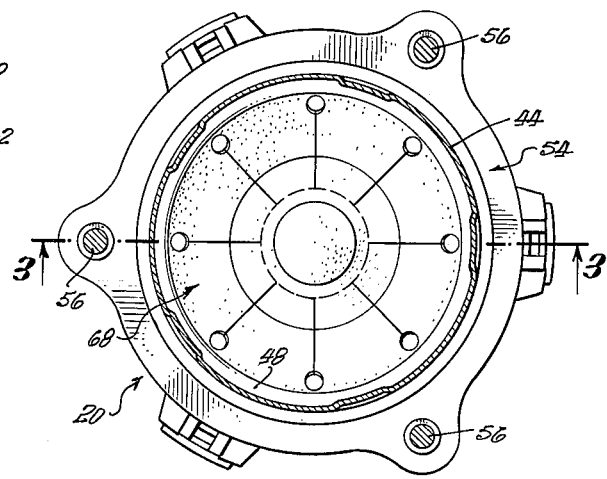
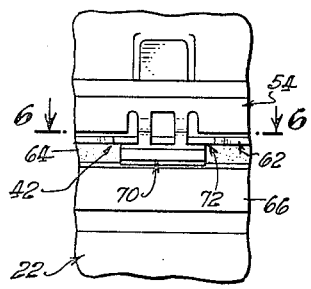
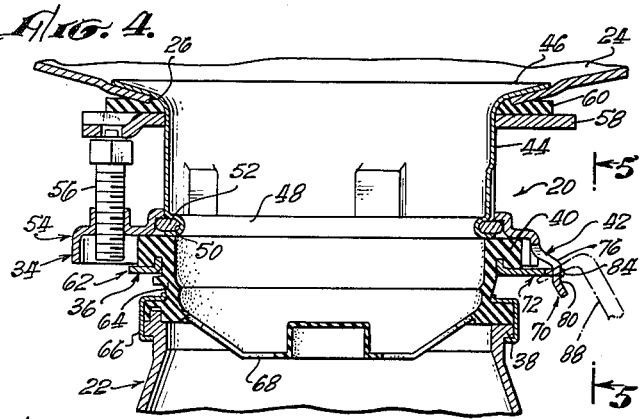
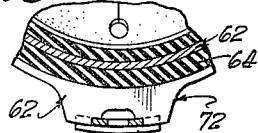
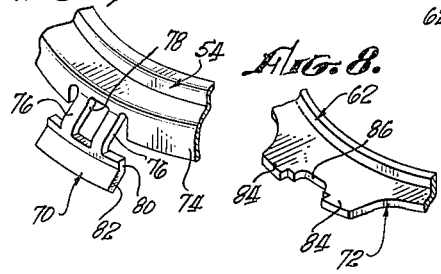
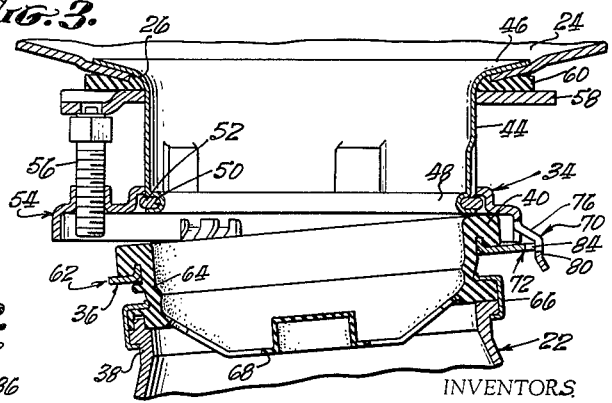
INVENTORS
HANS JORDAN,
JEROME F. STRATMAN,
BY THEIR ATTORNEYS
HARRIS, KIECH, RUSSELL & KERN

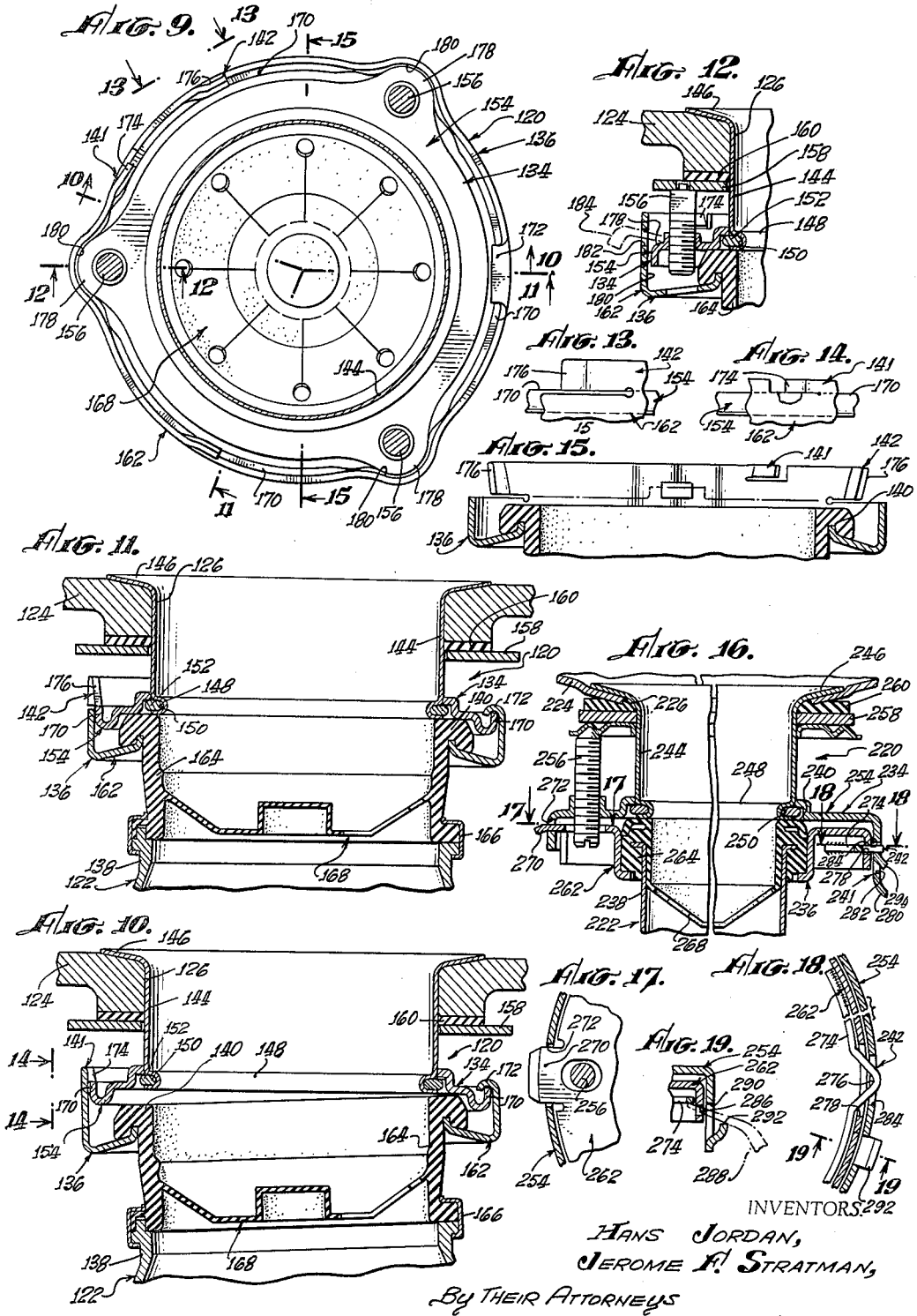

United States Patent Office 3,246,132
Patented Apr. 12, 1966

3,246,132
SUPPORTING STRUCTURE FOR WASTE DISPOSAL APPARATUS
Hans Jordan, Los Angeles, and Jerome F. Stratman, Downey, Calif., assignors to Waste King Corporation, Los Angeles, Calif., a corporation of California
Filed Nov. 18, 1963, Ser. No. 324,393
7 Claims. (Cl. 285—158)

The present invention relates in general to an apparatus for comminuting waste material, such as food waste or garbage, so that it may be flushed away, and relates more particularly to an improved supporting structure for releasably suspending a waste disposal apparatus from a sink beneath and in communication with a drain opening in the sink.

The usual supporting structure for suspending a waste disposal apparatus from a kitchen sink in the home normally comprises: annular mounting means including a mounting ring and means for connecting it to the sink beneath and in alignment with the drain opening therein; annular supporting means for the waste disposal apparatus including a supporting ring and means for connecting it to the upper end of the waste disposal apparatus; annular sealing means insertable between the mounting and supporting means; and means for connecting the supporting ring to the mounting ring with the sealing means clamped between the supporting and mounting means in a fluid tight manner. Conventionally, the supporting ring is connected to the mounting ring by nuts threaded on circumferentially spaced bolts forming part of the means for connecting the mounting ring to the sink, these nuts serving to cause the supporting ring to clamp the sealing means between the mounting and supporting means.

Installing a waste disposal apparatus with the foregoing conventional supporting structure is a rather strenuous operation since at least a substantial part of the weight of the apparatus must be supported manually until on or more of the nuts mentioned are threaded on the corresponding bolts. In some instances, it may be necessary to support the entire weight of the apparatus manually until at least one nut is threaded on its bolt, a substantial part of the weight of the apparatus thereafter being manually supported until a second nut is threaded on its bolt.

A general object of the invention is to make the operation of installing the waste disposal apparatus less arduous by requiring the person making the installation to support the apparatus manually only momentarily.

More particularly, a primary object of the invention is to provide interengageable means on the mounting and supporting rings which operates with a snap action to releasably clip the supporting ring onto the mounting ring, with the annular sealing means clamped between the mounting means and the supporting means, so that it is necessary to support the waste disposal apparatus manually for only a short period of time much less than the time required to thread one or more nuts onto corresponding bolts.

Another important object of the invention is to provide a supporting structure which includes first interengageable means operating with a snap action for releasably connecting the supporting ring to the mounting ring in an initial position of the supporting ring wherein the annular sealing means is not clamped between the mounting means and the supporting means, and which includes second interengageable means operating with a snap action for releasably connecting the supporting ring to the mounting ring in a final position of the supporting ring wherein the annular sealing means is clamped between the supporting means and the mounting means. A related object is to provide first and second interengageable means each of which includes at least one resiliently deformable locking element on one of the rings releasably engageable with a mating locking element on the other with a snap action.

With the foregoing construction, the waste disposal apparatus is easily hung in an initial position temporarily upon interengagement of the interengageable elements of the first snap action means. The interengageable elements of the first snap action means are readily interengaged while the weight of the waste disposal apparatus is supported manually. Consequently, it is necessary to support the weight of the waste disposal apparatus manually for only a short period of time. Subsequent movement of the supporting ring into its final position, wherein the interengageable elements of the second snap action means are interengaged and wherein the annular sealing means is clamped between the supporting means and the mounting means, is accomplished without any necessity for manual support of the waste disposal apparatus, which is an important feature.

Another important object of the invention is to provide means on the mounting and supporting rings engageable by a prying tool for prying the supporting ring from its initial position into its final position to engage the interengageable elements of the second snap action means and to clamp the annular sealing means between the supporting means and the mounting means. Thus, it is unnecessary to support the waste disposal apparatus manually in displacing the supporting ring from its initial position into its final position.

A further object of the invention is to provide a supporting structure of the foregoing nature wherein the second snap action means mentioned includes at least two circumferentially spaced, resiliently deformable locking elements on one of the rings respectively releasably engageable with circumferentially spaced, mating locking elements on the other.

Still another object is to provide a supporting structure wherein the second snap action means includes three circumferentially spaced locking elements on one of the rings respectively releasably engageable with three circumferentially spaced, mating locking elements on the other, and wherein at least two of the locking elements on one of the rings are resiliently deformable into and out of engagement with their respective mating locking elements on the other of the rings. A related object is to provide a second snap action means wherein neither of the locking elements of the third pair is resiliently deformable, the locking elements of such pair being merely interengageable without resilient deformation of either.

Yet another object of the invention is to provide a supporting structure wherein certain of the locking elements are common to both the first snap action means for holding the supporting ring in its initial position and the second snap action means for securing it in its final position, thereby reducing the total number of locking elements required.

The foregoing objects, advantages, features and results of the present invention, together with various other objects, advantages, features and results thereof which will be evident to those skilled in the art to which the invention relates in the light of this disclosure, may be achieved with the exemplary embodiments of the invention described in detail hereinafter and illustrated in the accompanying drawings, in which:

FIG. 1 is a side elevational view, on a reduced scale, showing a household food waste disposal apparatus suspended from a kitchen sink with the supporting structure of the invention;

FIG. 2 is an enlarged horizontal sectional view through the supporting structure which is taken along the arrowed line 2—2 of FIG. 1;

FIGS. 3 and 4 are vertical sectional views taken as indicated by the arrowed line 3—3 of FIG. 2, FIGS. 3 and 4 respectively showing a supporting ring of the supporting structure in initial and final positions relative to a mounting ring thereof;

FIG. 5 is a fragmentary side elevational view taken as indicated by the arrowed lined 5—5 of FIG. 4;

FIG. 6 is a sectional view taken as indicated by the arrowed line 6—6 of FIG. 5;

FIGS. 7 and 8 are fragmentary perspective views of mating locking elements respectively carried by the mounting and supporting rings of the supporting structure;

FIG. 9 is a horizontal sectional view similar to FIG. 2, but illustrating another embodiment of the invention;

FIGS. 10 and 11 are vertical sectional views respectively taken along the arrowed lines 10—10 and 11—11 of FIG. 9 and respectively illustrating initial and final positions of a supporting ring of the supporting structure relative to a mounting ring thereof;

FIG. 12 is a fragmentary vertical sectional view taken along the arrowed line 12—12 of FIG. 9;

FIGS. 13 and 14 are fragmentary side elevational views taken as indicated by the arrowed lines 13—13 and 14—14 of FIGS. 9 and 10, respectively;

FIG. 15 is a vertical sectional view of an annular supporting means and supporting ring of the supporting structure of the invention, and is taken as indicated by the arrowed line 15—15 of FIG. 9;

FIG. 16 is a fragmentary vertical sectional view similar to FIGS. 4 and 11, but illustrating still another embodiment of the invention;

FIGS. 17 and 18 are fragmentary horizontal sectional views respectively taken as indicated by the arrowed lines 17—17 and 18—18 of FIG. 16; and FIG. 19 is a fragmentary vertical sectional view taken as indicated by the arrowed line 19—19 of FIG. 18.

SUPPORTING STRUCTURE 20 OF FIGS. 1 TO 8

Referring to FIGS. 1 to 8 of the drawings, illustrated therein is a supporting structure 20 of the invention for suspending a food waste disposal apparatus 22 from a kitchen sink 24 beneath and in communication with a drain opening 26 in the sink. The disposal apparatus 22 is conventional and includes an upper comminuting section 28 having therein rotary comminuting means, not shown, driven by an electric motor 30. The comminuted food waste is flushed away through a drain outlet 32 by water flowing from the sink 24 downwardly through the supporting structure 20 and the comminuting section 28.

Considering the supporting structure 20 generally it includes an upper annular mounting means 34 connected to the sink 24 in a position beneath and in communication with the drain opening 26, lower annular supporting means 36 for the disposal apparatus 22 connected to the upper end 38 of the comminuting section 28 of the disposal apparatus, annular sealing means 40 between the mounting means 34 and the supporting means 36, and interengageable means 42 of the invention on the mounting and supporting means for releasably connecting the supporting means 36 to the mounting means 34 with the sealing means 40 clamped therebetween in a fluid tight manner.

The mounting means 34 may be generally similar to that of my Patent No. 3,076,611, granted February 5, 1963, and is shown as including a relatively thin metal sleeve 44 extending downwardly through the drain opening 26 of the sink 24 and provided at its upper end with an outwardly extending annular flange 46 seated on the upper surface of the bottom wall of the sink around the drain opening therein. The sleeve 44 is rolled inwardly and then outwardly adjacent its lower end to provide an inwardly extending annular bead 48 forming an outwardly facing annular groove 50 receiving a snap ring 52 therein. The annular mounting means 34 includes a mounting ring 54 which encircles the sleeve 44 and the inner periphery of which is seated on and supported by the snap ring 52. Three circumferentially spaced vertical screws 56 are threaded into the mounting ring 54 and are seated at their upper ends against a washer 58. An annular seal 60 is inserted between the washer 58 and the lower surface of the bottom wall of the sink 24, such annular seal also engaging the external periphery of the sleeve 44 and the lower surface of the flange 46 thereon. As will be apparent, by rotating the screws 56 in a direction to increase the spacing between the mounting ring 54 and the washer 58, the flange 46 on the sleeve 44 is seated firmly against the upper surface of the bottom wall of the sink 24 around the drain opening 26 therein, and the annular seal 60 is simultaneously clamped against the upper surface of the washer 58, the lower surface of the bottom wall of the sink and the lower surface of the flange 46 on the sleeve. The result is a fluid tight seal between the bottom wall of the sink 24 and the sleeve 44.

The supporting means 36 may also be generally similar to that of the aforementioned patent, and is shown as including a supporting ring 62 having its inner periphery embedded in, and, if desired, bonded to, the upper end of an elastomeric supporting sleeve 64 for the disposal apparatus 22. In the construction illustrated, the upper end of the elastomeric supporting sleeve 64 provides the hereinbefore-mentioned annular sealing means 40 for producing a fluid tight seal between the annular mounting means 34 and the annular supporting means 36. The lower end of the elastomeric supporting sleeve 64 is suitably connected to the upper end 38 of the disposal apparatus 22, as by means of a clamping ring or clamping clips 66. Additionally, the lower end of the elastomeric supporting sleeve 64 may be bonded to the upper end 38 of the disposal apparatus 22. The elastomeric supporting sleeve 64 is also shown as having formed integrally therewith an antisplash device 68 similar to that of my Patent No. 2,948,482, granted August 9, 1960.

The interengageable means 42 of the invention is carried by the mounting and supporting rings 54 and 62 and operates with a snap action to clip the supporting ring onto the mounting ring with the sealing means 40 clamped between the mounting and supporting means 34 and 36. Consequently, manual support of the weight of the disposal apparatus 22 in installing it is minimized, as will be described in more detail hereinafter.

In the embodiment of the invention under consideration, the snap action interengageable means 42 for clipping the supporting ring 62 onto the mounting ring 54 includes three circumferentially spaced, resiliently deformable locking elements 70 on the mounting ring 54 which are respectively releasably engageable with three circumferentially spaced, matting locking elements 72 on the supporting ring 62. Each locking element 70 is engageable with its mating locking element 72 with a snap action, as will be described. In the construction illustrated, the locking elements 70 and 72 are respectively integral with the mounting and supporting rings 54 and 62, but it will be understood that the locking elements 70, or the locking elements 70 and 72, may be separate elements suitably secured to their respective rings.

Considering the interengageable means 42 in more detail, the mounting ring 54 is shown as provided with a peripheral skirt 74 having the locking elements 70 formed integrally therewith. As best shown in FIG. 7, each locking element 70 includes two downwardly and outwardly extending arms 76 having an opening 78 therebetwen and having a locking lug 80 at their lower or outer ends. The locking lug 80 extends circumferentially beyond the arms 76 and the lower portion of the locking lug comprises an outwardly and downwardly sloping cam 82.

As best shown in FIG. 8, each locking element 72 on the supporting ring 62 includes two circumferentially spaced, radially outwardly extending, locking lugs 84 adapted to receive therebetween the arms 76 of the corresponding locking element 70 and to seat on the ends of the locking lug 80 thereof. The supporting ring 62 is provided with a radially inwardly extending notch 86 between the locking lugs 84.

OPERATION OF SUPPORTING STRUCTURE 20

In considering the operation of the supporting structure 20, it will be assumed that the various elements of the mounting means 34 have previously been assembled, the same applying to the various elements of the supporting means 36.

The first step in clipping the supporting ring 62 onto the mounting ring 54 in accordance with the invention is to seat the locking lugs 84 of one of the locking elements 72 on the ends of the locking lug 80 of the corresponding locking element 70, as shown in FIG. 3 of the drawings. It is necessary for the person making the installation to support the full weight of the disposal apparatus 22 for only a short period of time in accomplishing this. Subsequently, the person making the installation manually supports only part of the weight.

The next step is to take a suitable prying tool, such as the tool 88 shown in broken lines in FIG. 4, and insert it through the opening 78 of another of the locking elements 70 into the notch 86 of the mating locking element 72. The prying tool 88 is then pivoted about the lower edge of the opening 78 to pry the corresponding portion of the supporting ring 62 upwardly into its final position relative to the mounting ring 54, thus inter-engaging the two locking elements 70 and 72 in question. As the supporting ring 62 is pried upwardly in this fashion, the locking lugs 84 of the pertinent locking element 72 engage the cam 82 of the corresponding locking element 70 to displace the corresponding locking lug 80 outwardly so that the locking lugs 84 can move upwardly therepast. Thereupon, the locking lug 80 springs inwardly so that the locking lugs 84 rest on the ends of the locking lug 80, this occurring with a snap action.

The foregoing operations are then repeated with the third pair of locking elements 70 and 72, thus completing the operation of clipping the supporting ring 22 onto the mounting ring 54 and of simultaneously clamping the sealing means between the mounting and supporting means 34 and 36.

As will be apparent, the snap action interengageable means 42 of the invention makes the operation of hanging the disposal apparatus 22 a very simple one which requires that the weight of the apparatus be supported manually for only a relatively short period of time. More particularly, manual support of the full weight of the disposal apparatus 22 is necessary only long enough to interengage one pair of the locking elements 70 and 72. Subsequently, it is necessary to partially support the weight of the disposal apparatus 22 only long enough to interengage a second pair of the locking elements 70 and 72, it being unnecessary to manually support any of the weight of the disposal apparatus in interengaging the third pair of locking elements 70 and 72.

SUPPORTING STRUCTURE 120 OF FIGS. 9 TO 15

Turning to FIGS. 9 to 15 of the drawings, illustrated therein is a supporting structure 120 for suspending a waste disposal apparatus 122 from a sink 124 below and in communication with a drain opening 126 in the bottom wall of the sink. The supporting structure 120 is generally similar to the supporting structure 20 and includes an annular mounting means 134 connected to the sink 124 in much the same manner as the mounting means 34, an annular supporting means 136 connected to the upper end 138 of the disposal apparatus 122 in a manner similar to the supporting means 36, and an annular sealing means 140 adapted to be clamped between the mounting and supporting means 134 and 136 in substantially the same way as the sealing means 40. The supporting means 136 is adapted to be clipped on to the mounting means 134 in initial and final positions of the supporting means by first and second snap action interengageable means 141 and 142, respectively, as will be described in more detail hereinafter.

Considering the mounting means 134 in more detail, it includes a sleeve 144 having a flange 146, a bead 148 and a groove 150, a snap ring 152 in the groove 150, a mounting ring 154 seated on the snap ring 152, and screws 156 threaded into the mounting ring 154 and seated against a washer 158 to clamp an annular seal 160 against the underside of the bottom wall of the sink 124. The elements 144, 146, 148, 150, 152, 154, 156, 158 and 160 respectively correspond to the elements 44, 46, 48, 50, 52, 54, 56, 58 and 60 so that a further description is not necessary.

The supporting means 136 includes a supporting ring 162 and an elastomeric supporting sleeve 164 having an integral antisplash device 168 and connected to the upper end 138 of the disposal apparatus 122 by a clamping ring or clamping clips 166. The elements 162, 164, 166 and 168 are respectively similar to the elements 62, 64, 66 and 68 so that a further description is not needed.

The outer periphery of the mounting ring 154 provides three circumferentially spaced locking elements 170 having the form of upturned lips. The outer periphery of the supporting ring 162 is also turned upwardly and is adapted to telescope upwardly over the circumferentially spaced locking lips 170, as best shown in FIG. 11 of the drawings. The upturned external periphery of the supporting ring 162 is provided with a downturned portion forming a hook-like locking element or locking hook 172 adapted to hook over any of the locking lips 170, as shown in FIGS. 10 and 11 of the drawings. The locking hook 172 and the locking lip 170 engaged thereby constitute interengageable locking elements common to both the first interengageable means 141 and the second interengageable means 142.

The first interengageable means 141 additionally includes an inwardly struck, resiliently outwardly deformable locking element 174, FIGS. 9, 10, 14 and 15, having the form of a circumferentially extending locking tongue adapted to engage the upper edge of one of the locking lips 170. When the locking hook 172 is in engagement with one of the locking lips 170 and the locking tongue 174 is in engagement with another of the locking lips 170, as shown in FIGS. 10 and 14, the disposal apparatus 122 is temporarily supported with the supporting ring 162 in an initial position, relative to the mounting ring 154, wherein the sealing means 140 is not clamped between the mounting and supporting means 134 and 136. As will be apparent, by engaging the locking hook 172 with one of the locking lips 170, and then pivoting the disposal apparatus 122 about the point of engagement between the locking hook and its locking lip, the locking tongue 174 is cammed outwardly by the locking lip 170 thereadjacent, until it reaches an elevation sufficient to permit it to snap inwardly into engagement with the upper edge of such adjacent locking lip, as shown in FIGS. 10 and 14, to support the disposal apparatus 122 with the supporting ring 162 in its initial position.

In addition to the locking hook 172 and the locking lip 170 engaged thereby, the second interengageable means 142 includes two inwardly struck, resiliency outwardly deformable, circumferentially extending locking elements or tongues 176 spaced circumferentially from the locking hook. When the supporting ring 162 is in its final position relative to the mounting ring 154, wherein the sealing means 140 is clamped between the mounting and supporting means 134 and 136, the two locking tongues 176 are respectively seated on the upper edges of the locking lips 170 which are spaced from the locking lip engaged by the locking hook 172. As in the case of the locking tongue 174, the locking tongues 176 are cammed outwardly by the adjacent locking lips 170 as the supporting ring 162 is pivoted about the point of engagement of the locking hook 172 with its locking lip 170. When the locking tongues 176 have been displaced upwardly sufficiently, they snap inwardly over the corresponding locking lips 170 to secure the supporting ring 162 in its final position wherein the sealing means 140 is clamped between the mounting and supporting means 134 and 136. While the various locking elements constituting the two interengageable means 141 and 142 are shown as formed integrally with the respective mounting and supporting rings 154 and 162, it will be unterstood that these locking elements, and particularly the resiliently deformable locking tongues 174 and 176, may be separate elements suitably mounted on the corresponding rings or ring.

OPERATION OF SUPPORTING STRUCTURE 120

The first step in hanging the disposal apparatus 122 with the supporting structure 120 is to engage the locking hook 172 with an appropriate one of the locking lips 170, as shown in FIG. 10 of the drawings. The external peripheries of the mounting and supporting rings 154 and 162 are respectively provided with mating radial projections and recesses 178 and 180 which serve to locate the locking hook 172 at the circumferential midpoint of the locking lip 170 which it engages.

With the weight of the disposal apparatus 122 now almost entirely supported by the locking 172 and the locking lip 170 engaged thereby, the apparatus is pivoted about the point of engagement of the locking hook and such locking lip to cause the locking tongue 174 to be displaced outwardly and subsequently to snap inwardly over the upper edge of the locking lip 170 thereadjacent, as shown in FIGS. 10 and 14. Under these conditions, the entire weight of the disposal apparatus 122 is supported by the first interengageable means 141. At this stage, the supporting ring 162 is in its initial position relative to the mounting ring 154, and the sealing means 140 is not yet clamped between the mounting and supporting means 134 and 136.

The next step is to further pivot the disposal apparatus 122, about the point of engagement of the locking hook 172 with the corresponding locking lip 170, until the locking tongues 176 snap inwardly over and seat on the adjacent locking lips 170. To facilitate this operation, the periphery of the supporting ring 162 is provided at a point diametrically opposite the locking hook 172, with an opening 182, FIG. 12, for a prying tool 184 engageable with the upper surface of one of the radial projections 178 on the mounting ring 154. With the prying tool 184, the portions of the supporting ring 162 opposite the locking hook 172 may readily be pried upwardly sufficiently to permit the locking tongues 176 to snap inwardly over and seat on the upper edges of the corresponding locking lips 170. Under such conditions, the supporting ring 162 is in its final position relative to the mounting ring 154, and the sealing means 140 is clamped between the mounting and supporting means 134 and 136 in a fluid tight manner.

As will be apparent, the supporting structure 120 of the invention may be utilized to hang the disposal apparatus 122 with minimum manual support of the weight of the disposal apparatus. The full weight of the disposal apparatus 122 must be supported manually only long enough to engage the locking hook 172 with the appropriate locking lip 170. Subsequently, the locking tongue 174 may be engaged with the locking lip 170 thereadjacent with only a slight manual effort. This accomplished, no further manual support of the weight of the disposal apparatus 122 is required, it merely being necessary, using the tool 184, to pry the supporting ring 162 upwardly sufficiently to engage the locking tongues 176 with the adjacent locking lips 170. Thus, the disposal apparatus 122 may be hung with a minimum expenditure of time and effort, which is an important feature.

Turning to FIGS. 16 to 19 of the drawings, illustrated therein is a supporting structure 220 of the invention for suspending a disposal apparatus 222 from a sink 224 beneath and in communication with a drain opening 226 therein. The supporting structure 220 is also generally similar to the supporting structure 20 and includes an annular mounting means 234 connected to the sink 224 in substantially the same way as the mounting means 34, and annular supporting means 236 connected to the upper end 238 of the disposal apparatus 222 in much the same manner as the supporting means 36, and an annular sealing means 240 adapted to be clamped between the mounting and supporting means 234 and 236 in substantially the same fashion as the sealing means 40. The supporting means 236 is adapted to be clipped onto the mounting means 234 in initial and final positions by first and second snap action interengageable means 241 and 242, respectively, as will be discussed in more detail herein.

The mounting means 234 includes elements 244, 246, 248, 250, 252, 254, 256, 258 and 260 respectively corresponding to the elements 44, 46, 48, 50, 52, 54, 56, 58 and 60. Consequently, no further description is necessary.

The supporting means 236 includes a supporting ring 262 which carries an elastomeric sleeve 264 having the annular sealing means 240 and an antisplash device 268 integral therewith. The upper end 238 of the disposal apparatus 222 is suitably secured to the elastomeric sleeve 264.

The outer peripheries of the mounting and supporting rings 254 and 262 provide depending skirts of diameters such that the supporting ring 262 is capable of telescoping upwardly into the mounting ring 254, as shown in FIG. 16 of the drawings. The peripheral skirt of the supporting ring 262 is provided with an outwardly struck, generally hook-like locking lug 270 which is insertable into a locking hole 272 in the peripheral skirt of the mounting ring 254. The locking lug 270 and the locking hole 272 form locking elements which are common to both the first and second interengageable means 241 and 242.

Located within the peripheral skirt of the supporting ring 262 on the opposite side thereof from the locking lug 270 is a spring wire 274 which has an angular extent of the order of 180°, or more, and which is welded or otherwise secured, to the inner surface of the peripheral skirt of the supporting ring adjacent its ends. The spring wire 274 is outwardly deformed to provide two locking projections 276 etxending outwardly through complementary holes 278 in the peripheral skirt of the supporting ring 262. (Only one of the locking projections 276 and one of the holes 278 is visible is the drawings.) The two locking projections 276 are spaced approximately 120° apart and are respectively spaced approximately 120° from the locking lug 270.

As each locking projection 276 is displaced upwardly into the interior of the mounting ring 254, it engages and is cammed inwardly by a downwardly and outwardly sloping cam 280 shown as integral with the peripheral skirt of the mounting ring 254. Above each cam 280 are two vertically spaced locking holes 282 and 284 into which the corresponding locking projection 276 snaps successively. Each lower locking hole 282 cooperates with the corresponding locking projection 276 to form part of the first snap action interengageable means 241, while each upper locking hole 284 cooperates with the corresponding locking projection 276 to form part of the second snap action interengageable means 242.

As shown in FIG. 19, the peripheral skirt of the supporting ring 262 is provided adjacent each locking projection 276 with a hole 286 to receive a prying tool 288 adapted to be inserted through a hole 290 in the peripheral skirt of the mounting ring 254 and to seat on an outwardly struck lug 292 thereon. With this construction, the prying tool 288 may be used to pry the supporting ring 262 upwardly to disengage the corresponding locking projection 276 from the corresponding lower locking hole 282 and to displace it upwardly into a position wherein it can snap outwardly into the upper locking hole 284. To facilitate disengagement of each locking projection 276 from the corresponding lower locking hole 282, the upper edge of such hole is defined by an outwardly and downwardly sloping cam 294.

OPERATION OF SUPPORTING STRUCTURE 220

The first step in hanging the disposal apparatus 222 is to insert the locking lug 270 into the locking hole 272. The full weight of the disposal apparatus 222 must be supported manually for only a brief interval in accomplishing this.

Next, by pivoting the disposal apparatus 222 about the point of engagement of the locking lug 270 with the locking hole 272, the locking projections 276 are caused to ride upwardly over the cams 280 and to snap into the lower locking holes 282. The disposal apparatus 222 is now supported temporarily with the supporting ring 262 its initial position relative to the mounting ring 254. The sealing means 240 is not clamped between the mounting and supporting means 234 and 236 under such conditions.

To complete the installation, it is merely necessary to insert the prying tool 288 into the holes 286 and 290 associated with each locking projection 276, and to pry the corresponding portion of the supporting ring 262 upwardly so as to cause the corresponding locking projection 276 to ride upwardly along the corresponding cam 294 and to ultimately snap outwardly into the corresponding upper locking hole 284. With both locking projections 276 snapped outwardly into their respective locking holes 284, the installation is completed with the supporting ring 262 in its final position relative to the mounting ring 254, and with the sealing means 240 clamped between the mounting and supporting means 234 and 236 in a fluid tight manner.

As in the case of the preceding embodiments, and particularly the embodiment of FIGS. 9 to 15, the time and effort required to hang the disposal apparatus 222 are minimized, which is an important feature.

CONCLUSION

As will be apparent, in each of the supporting structures 20, 120 and 220, the disposal apparatus may be demounted readily by disengaging the resiliently deformable locking elements from their mating locking elements. Any suitable tools may be utilized for this purpose.

Although exemplary embodiments of the invention have been disclosed herein for purposes of illustration, it will be understood that various changes, modifications and substitutions may be incorporated in such embodiments without departing from the spirit of the invention as defined by the claims which follow.

What is claimed is:
1. A supporting structure for suspending a waste disposal apparatus from a sink beneath a drain opening therein, including:
    (a) a mounting ring connectable to the sink in a position below the drain opening therein;
    (b) connecting means for firmly securing said mounting ring below said sink;
    (c) a supporting ring for the waste disposal apparatus connectable to the upper end of such apparatus;
    (d) first interengageable means on said mounting ring and on said supporting ring, respectively, for releasably securing said supporting ring to said mounting ring to thereby support at least a substantial portion of the weight of said waste disposal apparatus, said first interengageable means providing for pivotal movement between said mounting ring and said supporting ring;
    (e) second interengageable means on said mounting ring and on said supporting ring, said second interengageable means being spaced circumferentially from said first interengageable means a sufficient distance to support the remainder of said weight for further securing said supporting ring to said mounting ring; and
    (f) said second interengageable means including at least one pair of locking elements wherein one locking element of each pair is provided with shoulder means directed away from the other locking element of the respective pair, and wherein the other locking element of each pair includes a resiliently deformable portion normally disposed in interlocking position on said shoulder means, said deformable portion being resiliently deformable for movement out of engagement with said shoulder means to release the second interengageable means for separation of said mounting ring from said supporting ring, whereby said waste disposal apparatus may be readily removed from said sink after disengagement of said first interengageable means.

2. The supporting structure of claim 1 wherein said second interengageable means includes at least two circumferentially spaced pairs of said locking elements.

3. A supporting structure as defined in claim 1 wherein said locking elements are formed integrally with respect to said mounting ring and said supporting ring, respectively.

4. A supporting structure as defined in claim 1 wherein said first and second interengageable means include three circumferentially spaced locking elements of substantially similar construction.

5. A supporting structure as defined in claim 1 wherein said second interengageable means comprises at least two pairs of said locking elements and wherein one of said pairs of locking elements is interengageable at a level below the level at which a second of said pairs is interengageable.

6. A supporting structure as defined in claim 5 wherein said rings have means thereon engageable by a prying tool for prying said supporting ring from an initial position of engagement of said first pair of locking elements to a final position of engagement of said second pair of locking elements.

7. A supporting structure as defined in claim 1 wherein annular sealing means are provided between said mounting ring and said supporting ring.

References Cited by the Examiner

UNITED STATES PATENTS

| | | | |
|---|---|---|---|
| 1,053,743 | 2/1913 | Paiste | 285—203 |
| 1,115,989 | 11/1914 | Thurman | 285—7 |
| 1,160,611 | 11/1915 | Hudson | 285—319 X |
| 1,175,402 | 3/1916 | Baylis | 285—7 |
| 1,873,191 | 8/1932 | Fabrey | 285—319 X |
| 2,222,018 | 11/1940 | Bruce | 285—7 |
| 2,450,544 | 10/1948 | Foley | 285—320 |
| 2,537,284 | 1/1951 | Schuder | 285—319 |
| 2,772,836 | 12/1956 | Gebhart | 285—158 |
| 2,851,224 | 9/1958 | Jordan | 241—100.5 |
| 2,860,820 | 11/1958 | Falligant | 285—159 |
| 2,939,639 | 6/1960 | Loss | 285—321 X |
| 3,108,755 | 10/1963 | Yartz | 241—100 |

FOREIGN PATENTS

| | | |
|---|---|---|
| 1,078,404 | 11/1953 | France. |
| 1,253,390 | 1/1961 | France. |
| 521,693 | 3/1931 | Germany. |

CARL W. TOMLIN, *Primary Examiner.*